United States Patent [19]

Peterkort

[11] Patent Number: 5,597,278
[45] Date of Patent: Jan. 28, 1997

[54] LOCKING FASTENER ASSEMBLY FOR THREADED JOINT

[75] Inventor: Steven D. Peterkort, Hawthorn Woods, Ill.

[73] Assignee: MacLean-Fogg Company, Mundelein, Ill.

[21] Appl. No.: 506,186

[22] Filed: Jul. 24, 1995

[51] Int. Cl.$^6$ .......................... F16B 35/04; F16B 37/04; F16B 39/10
[52] U.S. Cl. .......................... 411/134; 411/120; 411/121
[58] Field of Search .................... 411/119, 120, 411/121, 129–131, 133–135, 149, 150

[56] References Cited

U.S. PATENT DOCUMENTS

| 3,389,735 | 6/1968 | Katz | 411/120 |
| 3,851,690 | 12/1974 | Wing et al. | 411/190 |
| 4,812,094 | 3/1989 | Grube | 411/134 |
| 4,976,576 | 12/1990 | Mahaney, Jr. et al. | 411/121 |
| 5,141,374 | 8/1992 | Olofsson | 411/198 X |

Primary Examiner—Neill R. Wilson
Attorney, Agent, or Firm—Mason, Kolehmainen, Rathburn & Wyss

[57] ABSTRACT

A free spinning positively locking fastener assembly for threaded joints such as automotive or truck wheel assemblies includes a flanged nut with a retainer washer captured on the nut flange. The washer includes a tab received in a slot of a wheel spindle to permit the washer to move axially and prevent the washer from rotating. A pair of resilient locking clips normally lock the nut to the washer to prevent relative rotation so that neither the nut nor the washer can rotate relative to the spindle. The locking clips are released by engagement of a wrench socket with the wrenching structure of the nut so that the nut can be threaded to a desired position. When the wrench is removed, locking fingers on the clips engage the washer to prevent the nut from rotating. The clips are located at diametrically opposed wrenching flats of the nut, spaced from the corners of the wrenching structure.

4 Claims, 2 Drawing Sheets

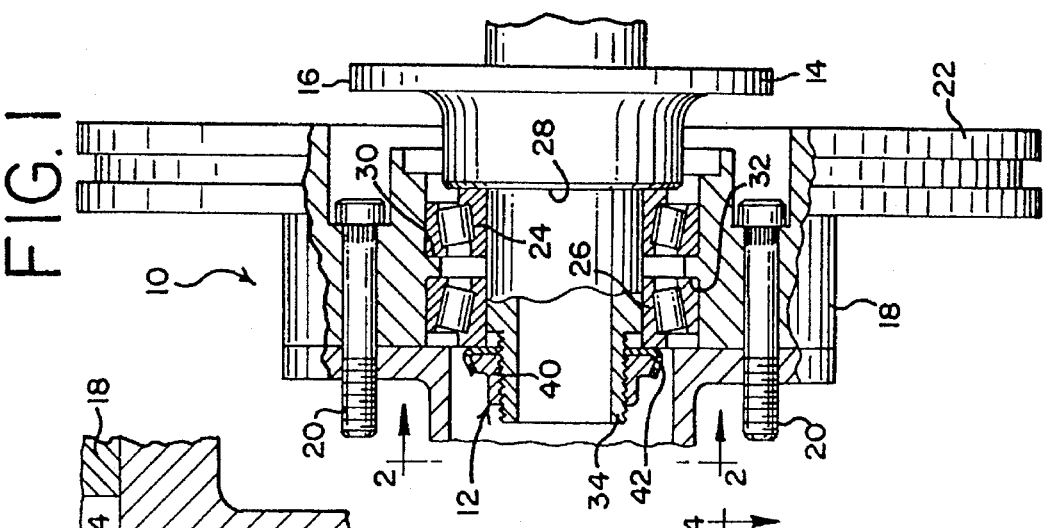
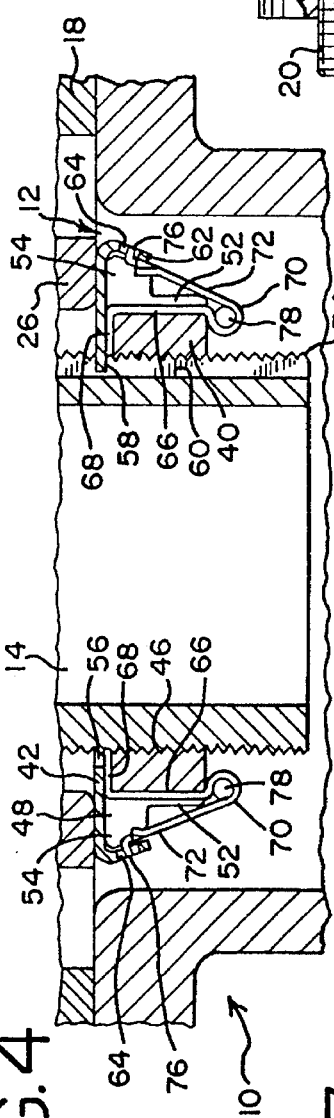

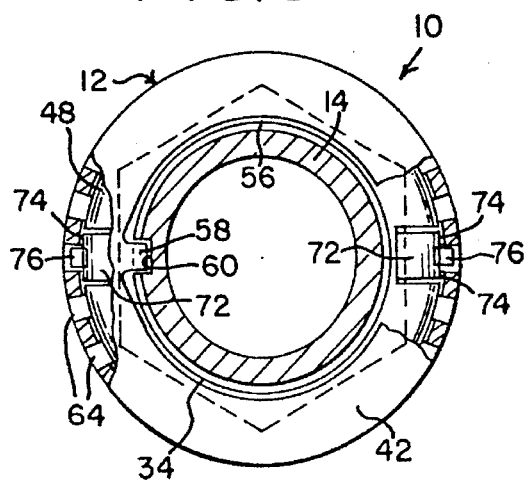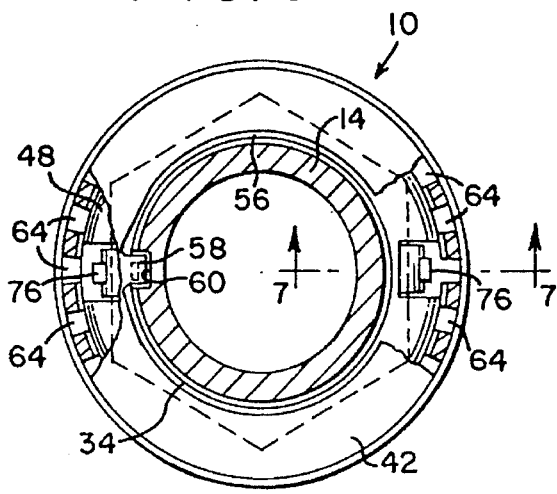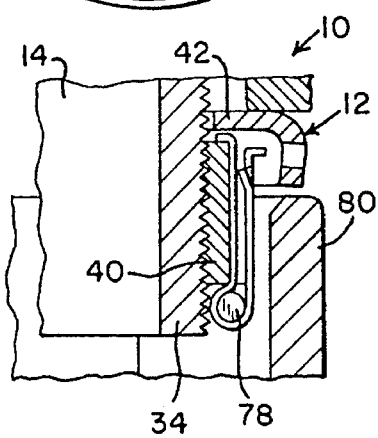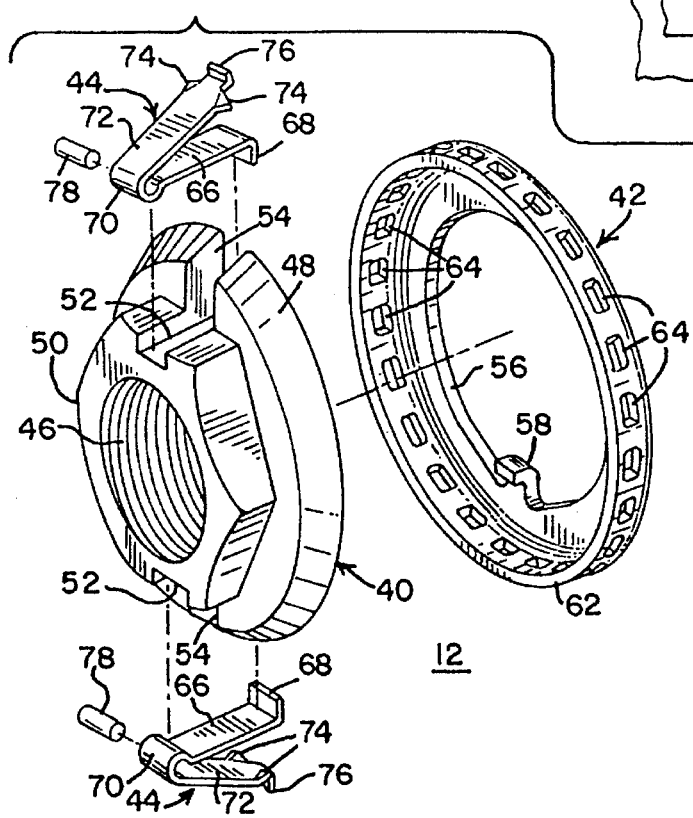

LOCKING FASTENER ASSEMBLY FOR THREADED JOINT

FIELD OF THE INVENTION

The present invention relates to fastener assemblies, and more particularly to an improved free spinning fastener assembly that is positively locked after installation.

DESCRIPTION OF THE PRIOR ART

U.S. Pat. No. 4,812,094 incorporated by reference herein discloses a free spinning positively locking fastener assembly for threaded joints such as automotive or truck wheel assemblies. That assembly includes a flanged nut with a retainer washer captured on the nut flange. The washer includes a tab received in a slot of a wheel spindle to permit the washer to move axially and prevent the washer from rotating. A locking clip locks the nut to the washer to prevent rotation of the nut relative to the spindle. The locking clip is released by engagement of a wrench socket with the wrenching structure of the nut so that the nut can be threaded to a desired position. When the wrench socket is removed, a locking finger on the clip engages the washer to prevent the nut from rotating.

This locking fastener assembly has suffered from disadvantages. One disadvantage is that the locking clip according to U.S. Pat. No. 4,812,094 is located at a corner of the wrenching structure where two wrenching flats intersect. In automotive assembly operations, impact wrench drivers are used to install wheel fastener assemblies, resulting in wear of wrench sockets. The problem of socket wear is particularly acute for sockets that are formed from sheet metal rather than being forged, as is common in larger socket sizes. Socket wear results in deformation of the corners of the sockets such that a socket that remains effective for tightening the nut of the fastener assembly is nevertheless ineffective to release the locking clip located at a corner of the nut. If the clip is not released, the clip can be destroyed in the tightening operation, resulting in an installed wheel hub with the nut not locked and engaged with the retainer. This allows the nut to rotate on the spindle.

Another disadvantage of the known locking fastener assembly is that with the clip located at a corner of the nut, the nut engages the edges of the clip latch release segment. Contact with the edges is not as effective or as reliable as a firm face to face contact in the plane of the latch release segment.

Use of a single locking clip in accordance with U.S. Pat. No. 4,812,094 results in an arrangement wherein the locking function is dependent on a single component. In addition, a single resilient clip located between the nut and the retainer washer introduces an imbalance because the resilient clip tends to separate the nut and the washer at a single point around the periphery of the nut.

SUMMARY OF THE INVENTION

A principal object of the present invention is to provide improvements in fastener assemblies of the type disclosed in U.S. Pat. No. 4,812,094. Other objects are to provide locking fastener assemblies tolerant to wrench socket wear; to provide locking fastener assemblies with redundant locking capability; to provide locking fastener assemblies wherein forces are balanced; to provide locking fastener assemblies with reliable face to face clip engagement; and to provide locking fastener assemblies in which locking clips assist in the engagement between the fastener assembly and a wrench socket.

In brief, in accordance with the present invention there is provided a threaded joint such as an automotive wheel assembly of the type tightened or loosened by a wrench socket. The term "automotive" as used herein is intended to encompass wheeled vehicles such as trucks, trailers, automobiles and the like. The assembly includes a fixed mounting structure having a threaded member extending along an axis and including first restraining means. A locking fastener assembly engages the fixed mounting structure and includes a rotatable fastener and a retainer. The fastener has a tool receiving portion with wrenching flats and corners between the flats, a flange, and a thread structure engageable with the threaded member for tightening and loosening of the threaded joint in response to rotation of the fastener around the axis. The retainer includes means for holding the retainer in relatively rotatable assembly with the flange. The retainer includes second restraining means engageable with the first restraining means for permitting axial movement and preventing rotation of the retainer relative to the fixed mounting structure. Latch means is connected between the fastener and the retainer for permitting relative rotation between the fastener and the retainer in a released position and preventing relative rotation between the fastener and the retainer in a latched position. The latch means includes latch release means disposed at the tool receiving portion of the fastener for releasing the latch means in response to engagement of the fastener by the tool. The latch means includes a pair of resilient latch clips mounted in a resiliently compressed condition at diametrically opposed positions between the fastener and the retainer on wrenching flats and spaced from the corners.

BRIEF DESCRIPTION OF THE DRAWING

The present invention together with the above and other objects and advantages may best be understood from the following detailed description of the preferred embodiments of the invention illustrated in the drawings, wherein:

FIG. 1 is a simplified and partly diagrammatic, fragmentary side elevational view of an axle assembly provided with a locking fastener assembly according to the present invention;

FIG. 2 is an enlarged end view taken from the line 2—2 of FIG. 1;

FIG. 3 is a sectional view taken along the line 3—3 of FIG. 2;

FIG. 4 is an enlarged sectional view taken along the line 4—4 of FIG. 2;

FIG. 5 is a sectional view taken along the line 5—5 of FIG. 3;

FIG. 6 is a view like FIG. 5 illustrating the locking fastener assembly in the released condition;

FIG. 7 is a view like part of FIG. 4 illustrating the locking fastener assembly in the released condition; and FIG. 8 is a perspective view illustrating the components of the locking fastener assembly prior to assembly.

DETAILED DESCRIPTION OF THE PREFERRED EMBODIMENTS

Having reference to the drawings, in FIG. 1 there are illustrated some components of a threaded joint generally designated as 10 including a locking fastener assembly generally designated as 12. Threaded joint 10 illustrates one of numerous possible applications of the assembly 12 and is an axle bearing assembly for a vehicle such as a truck.

Assembly 10 includes a spindle 14 having a flange 16 for attaching the spindle 14 to the frame of an automotive vehicle. A wheel hub 18 carries studs 20 used for mounting a wheel (not shown) on the hub 18. The hub 18 includes a brake disc 22. The hub 18 is mounted for rotation on the spindle by inner and outer bearing assemblies 24 and 26 held in position by the locking fastener assembly 12 of the present invention. The locking fastener assembly 12 can be used in the illustrated joint 10 or in many other types of axle assemblies to prevent excessive loading or excessive end play of wheel bearing assemblies.

In the illustrated arrangement, the inner bearing assembly 24 is captured between a shoulder 28 on the spindle 14 and a shoulder 30 on the wheel hub 18. The outer bearing assembly 26 is captured between a shoulder 32 on the wheel hub 18 and the locking fastener assembly 12. In some assemblies, spacers or other components may be included in the threaded joint for positioning the bearing assemblies.

Assembly 12 is threaded onto a threaded portion 34 of the spindle 14 to secure the wheel hub 18 and bearing assemblies 24 and 26 in place and to take up looseness and play in the bearing assemblies 24 and 26. If assembly 12 is not threaded far enough onto portion 34, or if assembly 12 were to become unthreaded, the bearings would have excessive free play and their operating life would be shortened. If the assembly 12 were threaded too tightly onto threaded portion 34, the excessive load on the bearing assemblies 24 and 26 would also result in shortened operating life. It is important that the fastener assembly 12 is threaded onto the threaded portion 34 properly and that the assembly is thereafter prevented from rotating.

Locking fastener assembly 12 includes a nut 40, a retainer washer 42 and a pair of locking clips 44. The washer 42 can move axially along the threaded portion 34 of the spindle 14 but is prevented from rotating relative to the threaded portion 34. The clips 44, when disengaged, permit the nut 40 to rotate relative to the threaded portion 34 when the fastener assembly is threaded onto the portion 34 with a tool and thereafter, when engaged, provide a positive locking action by preventing the nut 40 from rotating relative to the washer 42 and threaded portion 34.

Nut 40 includes internal threads 46 mating with the threaded portion 34 of the spindle 14. An increased diameter flange 48 is in load bearing contact with the outer bearing assembly 26. A hexagonal wrenching structure 50 including flats and corners permits the nut 40 to be threaded onto the portion 34 with a wrench socket. A pair of diametrically opposed grooves 52 extend axially across two of the flats of the wrenching structure 50. Each groove 52 intersects a radially extending recess 54 in the nut flange 48.

Retaining washer 42 is a stamped and formed sheet metal part or is made of a similar material, and includes a central axial opening 56 that is slidably received over the threaded portion 34 of the spindle 14. A restraining tab 58 extends radially inward into the central opening 56. Threaded portion 34 of the spindle 14 includes an axially extending slot 60 receiving the tab 58. Engagement of the tab 58 in the slot 60 permits the washer 42 to move axially along the portion 34 while preventing rotation of the washer 42 on the threaded portion 34. The outer periphery of the washer 42 is defined by a continuous rim 62 and a series of recesses 64 are located adjacent the rim 62. The washer 42 is loosely captured on the nut 40 by forming the rim 62 around and over the flange 48 of the nut 40. After this forming operation, the recesses 64 in the washer 42 are disposed generally axially and are aligned with the nut flange 48 and the radially extending recesses 54.

Each locking clip 44 is stamped and formed from spring steel sheet material or a similar flexible, resilient material. Clips 44 include base portions 66 joined to foot portions 68 received respectively in the grooves 52 and recesses 64 of the nut 40. Loop or hinge portions 70 are formed at the ends of the base portions 66 opposite the foot portions 68. Elongated latch release segments 72 extend at an angle from the loop portions 70 and terminate in stop shoulders 74 and locking fingers 76. Pins 78 formed of plastic or the like are received into the loop portions 70 to reinforce the locking clips 44.

Clips 44 are captured between the nut 40 and the retaining washer 42. The base portions 66 are received in the axial grooves 52 and the foot portions 68 are engaged in the recesses 54. The loop portions 70 extend over the top of the nut 40 to prevent the clips from being removed from the assembly 12.

Normally the locking fingers 76 are received in an opposed pair of the recesses 64, with the stop shoulders resiliently held in contact against the inside of the rim 62. As a result of this engagement, the nut 40 cannot be rotated relative to the retaining washer 42. Because the washer 42 is held against rotation relative to the threaded portion 34 by engagement of the tab 58 in the slot 60, the nut also cannot normally be rotated relative to the threaded portion 34.

In order to thread the assembly 12 onto the threaded portion 34 of the spindle 14, a wrench socket 82 is placed over the wrenching structure 50 of the nut 40 as seen in FIG. 7. The tool 80 contacts the release segments 72 of the clips and forces the clips to a retracted position illustrated in FIGS. 6 and 7. In this position, the locking fingers 76 are retracted from the recesses 64 and the nut 40 can rotate relative to the restraining washer 42.

To assemble a threaded joint 10, the hub 18 and the bearing assemblies 24 and 26 are placed upon the spindle 14. Then, using the tool 80, the locking fastener assembly 12 is threaded onto the portion 34 with the restraining tab 58 sliding axially along the slot 60. The tool 80 holds the clips 44 in the retracted positions of FIGS. 6 and 7 so that the nut 40 can be rotated relative to the washer 42 and the threaded portion 34.

When the locking fastener assembly 12 is threaded to the desired extent, as determined for example by measuring tightening torque or the position of the assembly 12, the tool 80 is withdrawn. In response, the fingers 76 enter an opposed pair of recesses 64 either immediately or when the nut 40 and washer 42 subsequently rotate a few degrees relative to one another. This locks the nut 40 and washer 42 against relative rotation, and prevents further rotation of the nut 40 relative to the threaded portion 34. Because the nut 40 cannot rotate, the axial loading of the bearing assemblies 24 and 26 cannot be inadvertently changed by loosening or tightening of the nut 40.

The clips 44 are located at the flats of the wrenching structure 50. As a result, the clips 44 are contacted by flats of the tool 80 rather than by corners where flats intersect. The tool 80 contacts the full widths of the release segments 72 in firm face to face contact, and the clips are reliably operated by engagement of the tool even if the corners of the socket wrench become worn. In addition the use of two diametrically opposed resilient clips holds the nut 40 in a centered position relative to the restraining washer 42. If one clip is inadvertently omitted or is damaged or lost, the second clip can still provide a redundant locking function. When a wrench socket is engaged onto the wrenching surface, the balanced and opposed resilient frictional contact between the socket flats and the latch release segments 72 tends to hold the assembly 12 in place in the socket.

While the present invention has been described with reference to the details of the embodiments of the invention shown in the drawing, these details are not intended to limit the scope of the invention as claimed in the appended claims.

What is claimed is:

1. A threaded joint such as an automotive wheel assembly of the type tightened or loosened by a wrench socket and comprising:

a fixed mounting structure including a threaded member extending along an axis and including first restraining means;

a locking fastener assembly engageable with said fixed mounting structure and including a rotatable fastener and a retainer;

said fastener having a tool receiving portion with wrenching flats and corners between said flats, a flange, and a thread structure engageable with said threaded member for tightening and loosening of the threaded joint in response to rotation of the fastener around the axis;

said retainer including means for holding said retainer in relatively rotatable assembly with said flange;

said retainer including second restraining means engageable with said first restraining means for permitting axial movement and preventing rotation of said retainer relative to said fixed mounting structure; and latch means connected between said fastener and said retainer for permitting relative rotation between said fastener and said retainer in a released position and preventing relative rotation between said fastener and said retainer in a latched position;

said latch means including latch release means disposed at said tool receiving portion of said fastener for releasing said latch means in response to engagement of said fastener by the tool;

the threaded joint being characterized by:

said latch means comprising a pair of resilient latch clips mounted in a resiliently compressed condition at diametrically opposed positions between said fastener and said retainer, said positions being on said wrenching flats and spaced from said corners.

2. A threaded joint as claimed in claim 1 wherein said fastener is a nut and said retainer is a washer with its periphery formed around said flange.

3. A threaded joint as claimed in claim 2 wherein said first restraining means is an axially extending slot in said threaded member and said second restraining means is a radially inwardly extending tab on said washer.

4. A locking fastener assembly comprising:

a nut having a flange and a body with a threaded axial opening and a hex shaped wrenching structure with flats and corners;

a washer having a central opening aligned with said axial opening and further including a tab extending radially into said central opening;

said washer having a peripheral region formed around said flange for rotatably capturing said washer on said nut;

a plurality of latch recesses adjacent said peripheral region;

said nut including a pair of diametrically opposed axially extending grooves in an opposed pair of flats of said wrenching structure; and a pair of resilient locking clips, each said locking clip having a base portion received in one of said grooves, a finger portion normally received in one of an opposed pair of said latch recesses to prevent rotation of said washer relative to said nut, and a latch release segment in the path of engagement of a wrench socket with said hex shaped wrenching structure.

\* \* \* \* \*